(12) United States Patent
Ying et al.

(10) Patent No.: US 12,070,015 B2
(45) Date of Patent: Aug. 27, 2024

(54) MULTI-LAYER, INTELLIGENT AND ENVIRONMENT-FRIENDLY BREEDING STRUCTURE FOR MEAT WATERFOWL

(71) Applicant: Jiangsu Academy of Agricultural Sciences, Nanjing (CN)

(72) Inventors: Shijia Ying, Nanjing (CN); Binbin Guo, Nanjing (CN); Rihong Guo, Nanjing (CN); Dongyue Sun, Nanjing (CN); Zichun Dai, Nanjing (CN); Zhendan Shi, Nanjing (CN); Zhe Chen, Nanjing (CN)

(73) Assignee: Jiangsu Academy of Agricultural Sciences, Nanjing (CN)

( * ) Notice: Subject to any disclaimer, the term of this patent is extended or adjusted under 35 U.S.C. 154(b) by 0 days.

(21) Appl. No.: 18/615,098

(22) Filed: Mar. 25, 2024

(65) Prior Publication Data

US 2024/0224948 A1    Jul. 11, 2024

Related U.S. Application Data

(63) Continuation of application No. PCT/CN2022/115823, filed on Aug. 30, 2022.

(30) Foreign Application Priority Data

Aug. 2, 2022   (CN) .......................... 202210919554.6

(51) Int. Cl.
*A01K 31/00*   (2006.01)
*A01K 1/00*    (2006.01)
(Continued)

(52) U.S. Cl.
CPC .......... *A01K 31/005* (2013.01); *A01K 1/0052* (2013.01); *A01K 31/04* (2013.01); *A01K 39/04* (2013.01)

(58) Field of Classification Search
CPC ...... A01K 31/005; A01K 31/04; A01K 31/00; A01K 39/04; A01K 1/0052; A01K 1/0047
See application file for complete search history.

(56) References Cited

U.S. PATENT DOCUMENTS

| 5,865,143 A | * | 2/1999 | Moore, Jr. | ................ A61L 9/01 239/210 |
| 7,661,391 B2 | * | 2/2010 | Sia | ......................... A01K 45/00 119/302 |

(Continued)

FOREIGN PATENT DOCUMENTS

| CN | 202425443 U | * | 9/2012 |
| CN | 102884990 A |   | 1/2013 |

(Continued)

OTHER PUBLICATIONS

Notification to Grant Patent for China Application No. 202210919554. 6, mailed Dec. 13, 2023.

(Continued)

*Primary Examiner* — Monica L Perry
*Assistant Examiner* — Aaron M Rodziwicz
(74) *Attorney, Agent, or Firm* — Pilloff Passino & Cosenza LLP; Rachel K. Pilloff; Sean A. Passino

(57) ABSTRACT

Provided is a multi-layer, intelligent and environment-friendly breeding structure for meat waterfowl, including house bodies, a manure treatment room, staircases and feeders. A bottom end net bed and an upper layer net bed are fixedly connected in the house body, and the upper layer net bed is located above the bottom end net bed. Manure dropping mechanisms are arranged side by side between the bottom end net bed and the upper layer net bed. Conveying mechanisms are arranged respectively on both sides of each of the manure dropping mechanisms. A plurality of conveyor belt conveyors are arranged side by side below the bottom end net bed. A transfer mechanism is arranged at one (Continued)

side of the each of the house bodies, and the transfer mechanism is used for collecting manure on the conveyor belt conveyors and the conveying mechanisms and transporting the manure to the fermentation mechanism.

4 Claims, 10 Drawing Sheets

(51) Int. Cl.
*A01K 31/04* (2006.01)
*A01K 39/04* (2006.01)

(56) References Cited

U.S. PATENT DOCUMENTS

| | | | | |
|---|---|---|---|---|
| 8,132,535 | B2 * | 3/2012 | Correa | A01K 31/007 |
| | | | | 119/448 |
| 11,197,465 | B2 * | 12/2021 | Otto-Lübker | A01K 31/04 |
| 2008/0178819 | A1 * | 7/2008 | Sia | A01K 39/04 |
| | | | | 119/300 |
| 2013/0067815 | A1 | 3/2013 | Koseoglu et al. | |
| 2023/0309515 | A1 * | 10/2023 | Lai | A01K 67/02 |
| | | | | 119/437 |

FOREIGN PATENT DOCUMENTS

| | | | |
|---|---|---|---|
| CN | 203884397 U | | 10/2014 |
| CN | 205143179 U | * | 4/2016 |
| CN | 105850755 A | | 8/2016 |
| CN | 106665374 A | | 5/2017 |
| CN | 107810911 A | | 3/2018 |
| CN | 107853190 A | | 3/2018 |
| CN | 107853211 A | | 3/2018 |
| CN | 108770701 A | | 11/2018 |
| CN | 109220886 A | * | 1/2019 |
| CN | 208300667 U | * | 1/2019 |
| CN | 208370647 U | | 1/2019 |
| CN | 210987675 U | | 7/2020 |
| CN | 211056941 U | | 7/2020 |
| CN | 111512994 A | | 8/2020 |
| CN | 112790111 A | | 5/2021 |
| CN | 213427753 U | | 6/2021 |
| CN | 213523439 U | | 6/2021 |
| CN | 213523440 U | | 6/2021 |
| CN | 113100115 A | * | 7/2021 |
| CN | 213695366 U | | 7/2021 |
| CN | 113924995 A | | 1/2022 |
| CN | 216363140 U | * | 4/2022 |
| KR | 20160021500 A | | 2/2016 |

OTHER PUBLICATIONS

First Search Report for China Application No. 202210919554.6, dated Dec. 11, 2023.
International Search Report for PCT/CN2022/115823, mailed Dec. 28, 2022.

* cited by examiner

MULTI-LAYER, INTELLIGENT AND ENVIRONMENT-FRIENDLY BREEDING STRUCTURE FOR MEAT WATERFOWL

CROSS-REFERENCE TO RELATED APPLICATIONS

This application is a continuation of PCT/CN2022/115823, filed Aug. 30, 2022 and claims priority of Chinese Patent Application No. 202210919554.6, filed on Aug. 2, 2022, the contents of which are hereby incorporated by reference.

TECHNICAL FIELD

The disclosure relates to the technical field of meat waterfowl breeding, and particularly to a multi-layer, intelligent and environment-friendly breeding structure for meat waterfowl.

BACKGROUND

The number of meat geese and meat ducks slaughtered in our country ranks first in the world. A contradiction between intensive farming and a shortage of land resources has become an important factor restricting the development of modern poultry farming. Under an influence of national livestock and poultry industry environmental protection policy, land use policy and breeding efficiency bottleneck, a problem of backward breeding mode in our country is further highlighted, and the breeding quantity is further compressed.

At present, domestic meat waterfowl breeding generally adopts modes of floor-rearing on the ground and large flat-layer net feeding, which have low land utilization rate. In recent years, with the tightening of environmental protection policy and an increasingly severe situation of difficult approval of breeding land, leading enterprises in the industry have taken the lead in trying to introduce a three-layer cage rearing mode of meat chickens to breed meat ducks as a whole, and improved cages in order to improve facilities, modernization and environmental protection level of meat duck breeding, such as a large-scale net feeding device for meat duck breeding disclosed in patent CN107853211A. However, there are some unavoidable problems in this model. Firstly, although this model has improved a level of intensive breeding, its welfare level is low. Under a background that European and American countries have banned caging of meat birds, this model is applied in meat duck, so as to cause a potential welfare crisis of meat ducks in our country and affect exports. Secondly, Meat ducks have high water contents in manure and a strong habit of playing with water. Poor ventilation conditions in cages result in high humidity in the cages under cage breeding mode, difficult to control the environment, high incidence rate of breeding meat ducks and more defective ducks. Thirdly, although this model improves a land use area, it is limited compared with an original floor-rearing model. For example, the land use area is increased by about 1.3 times with three layers and three rows of cages (the width of the house is about 8 meters) and by about 1.35 times with three layers and nine rows of cages (the width of the house is about 22 meters). Fourthly, it is difficult to achieve efficient and convenient resource utilization by gathering a large amount of manure in a short period of time. Patent CN211056941U discloses a dry-wet separation device for duck manure, which dries duck manure by vacuumizing a sealed tank, and boiling and stirring at a low temperature to improve evaporation efficiency. However, this method is inefficient and difficult to be applied to large-scale breeding. With the increasingly severe form of employment, a concern of animal welfare, and an increasing pressure of environmental protection year by year, it is urgent to innovate a multi-layer, intelligent and environment-friendly breeding structure for meat waterfowl.

SUMMARY

An object of the disclosure is to provide a multi-layer, intelligent and environment-friendly breeding structure for meat waterfowl, which includes house bodies, a manure treatment room, staircases and feeders, where multiple house bodies are arranged. One side of each of multiple house bodies is provided with each of the staircases, and each of the staircases is communicated with each of the house bodies. The manure treatment room is arranged at rear ends of the house bodies, a fermentation mechanism is arranged in the manure treatment room, and the feeders are arranged at front ends of multiple house bodies. A bottom end net bed and an upper layer net bed are fixedly connected in the each of the house bodies, and the upper layer net bed is located above the bottom end net bed. Multiple manure dropping mechanisms are arranged side by side between the bottom end net bed and the upper layer net bed, and the manure dropping mechanisms are fixedly connected with the each of the house bodies. Conveying mechanisms are arranged respectively on both sides of each of the manure dropping mechanisms, and one of the conveying mechanisms is shared between two adjacent manure dropping mechanisms. The conveying mechanisms are fixedly connected at a top end of the bottom end net bed, and multiple conveyor belt conveyors are arranged side by side below the bottom end net bed. A transfer mechanism is arranged at one side of the each of the house bodies, and the transfer mechanism is used for collecting manure on the conveyor belt conveyors and the conveying mechanisms and transporting the manure to the fermentation mechanism. Feeding mechanisms are arranged above the bottom end net bed and above the upper layer net bed, and the feeding mechanisms are fixedly connected with the each of the house bodies, and each of the feeders is communicated with the feeding mechanisms. A ventilation mechanism is installed on the each of the house bodies.

Optionally, the each of the manure dropping mechanisms includes a first smooth plate and a second smooth plate located between the bottom end net bed and the upper layer net bed. Polished rods are fixedly connected to the each of the house bodies, and one side of the first smooth plate and one side of the second smooth plate are both rotatably connected to one of the polished rods, and two sides of the one of the polished rods are symmetrically provided with first winders, and the first winders are fixedly connected with the each of the house bodies. The first winders are wound with first pull ropes, an end of one of the first pull ropes is fixedly connected with an other side of the first smooth plate, and an end of an other of the first pull ropes is fixedly connected with an other side of the second smooth plate.

Optionally, washing mechanisms are arranged above the first smooth plate and the second smooth plate respectively, and each of the washing mechanisms includes a shower pipe. The shower pipe is fixedly connected with the each of the house bodies, and a bottom end of the shower pipe is fixedly connected with multiple spray heads, and multiple spray heads are all communicated with the shower pipe.

Optionally, the transfer mechanism includes a manure collection tank arranged at one side of the each of the house bodies, and the conveyor belt conveyors and the conveying mechanisms are communicated with the manure collection tank. A liquid level sensor is fixedly connected to an inner wall at a top of the manure collection tank, a conveying pump is fixedly connected to a bottom end of the manure collection tank, and a discharge end of the conveying pump is fixedly connected with a conveying pipeline. An end of the conveying pipeline is positioned above the fermentation mechanism, and an outer wall at the end of the conveying pipeline is fixedly connected with an infrared sensor. A controller is fixedly connected to a side wall of the each of the house bodies, and the conveying pump, the liquid level sensor, the infrared sensor and the fermentation mechanism are all electrically connected to the controller.

Optionally, the conveying mechanisms include conveying grooves, where the conveying grooves are fixedly connected to the top end of the bottom end net bed, the conveying grooves are arranged respectively on both sides of the each of the manure dropping mechanisms, and one of the conveying grooves is shared between two adjacent manure dropping mechanisms. A screw conveyor is fixedly connected in each of the conveying grooves, and the conveying grooves are communicated with the manure collecting groove.

Optionally, the fermentation mechanism includes fermentation tanks fixedly connected to a bottom end of the manure treatment room, where a fermentation bed is laid at a bottom end of each of the fermentation tanks, and a rake-turning machine is erected at a top end of the each of the fermentation tanks. A manure hopper is hinged at a top end of the rake-turning machine, and the end of the conveying pipeline is located above the manure hopper, and a hydraulic cylinder is arranged between the manure hopper and the top end of the rake-turning machine. One end of the hydraulic cylinder is hinged with the rake-turning machine, and an other end of the hydraulic cylinder is hinged with the manure hopper, and the rake-turning machine is electrically connected with the controller.

Optionally, the rake-turning machine includes a frame, where the hydraulic cylinder and the manure hopper are both hinged at a top end of the frame. A rack is fixedly connected at the top end of the each of the fermentation tanks, travelling gears are rotatably connected at both sides of the frame respectively, and each of the travelling gears is meshed with the rack. A rotating roller is arranged below the frame, multiple rake-turning teeth are fixedly connected on the rotating roller, and a driving motor and a rotating motor are fixedly connected at the top end of the frame. The driving motor and one of the travelling gears, the rotating motor and the rotating roller are respectively in transmission connection through belts, and the driving motor and the rotating motor are electrically connected with the controller.

Optionally, the feeding mechanisms include main pipelines; the main pipelines are arranged above the bottom end net bed and above the upper layer net bed; the main pipelines are fixedly connected with the each of the house bodies, and the main pipelines are communicated with the each of the feeders; each of the main pipelines is fixedly connected with multiple branch pipes, and ends of multiple branch pipes are fixedly connected with feeding trays respectively, and the feeding trays and the main pipelines are both communicated with the branch pipes.

Optionally, the structure also includes water feeding mechanisms, where the water feeding mechanisms include water feeding pipes, and the water feeding pipes are arranged above the bottom end net bed and above the upper layer net bed; a second winder is arranged above each of the water feeding pipes, and the second winder is fixedly connected with the each of the house bodies; a second pull rope is wound around the second winder, and an end of the second pull rope is fixedly connected with the each of the water feeding pipes; multiple nipple drinking fountains are fixedly connected to the each of the water feeding pipes, and multiple nipple drinking fountains are communicated with the each of the water feeding pipes.

Optionally, the ventilation mechanism includes ventilation fans, and a rear end of the each of the house bodies is provided with multiple through holes, and the ventilation fans are fixedly connected in the through holes, and a side of the each of the house bodies close to the each of the staircases and a side of the each of the house bodies away from the each of the staircases are both provided with ventilation windows.

The disclosure discloses following technical effects.

Firstly, according to the disclosure, a manure dropping mechanism is arranged between the bottom end net bed and the upper layer net bed. When in use, the manure on the upper layer net bed drops on the manure dropping mechanism by self-gravity, and the manure slides into the conveying groove through the manure dropping mechanism, thus effectively avoiding problems of deviation and dripping easily caused by conveying the manure by the conveyor belt conveyors in a traditional multi-layer cage breeding, thereby avoiding a problem that the manure on an upper layer drops on a lower layer.

secondly, an inclination angle of the manure dropping mechanism may be adjusted. The manure dropping mechanism may be conveniently adjusted to a nearly horizontal position at an end of one-round feeding of waterfowl, so that a space between the upper layer net bed and the lower layer net bed is increased, grabbing and slaughter of waterfowl are convenient, and problems of difficulty in grabbing and high manual labor intensity during the slaughter of waterfowl in the multi-layer cage breeding are effectively solved.

Thirdly, according to the disclosure, the bottom end net bed and the upper layer net bed which are parallel up and down are arranged in the each of the house bodies, so that an activity space of waterfowl is effectively increased. Moreover, a house with this structure may provide a comfortable environment similar to floor-rearing for waterfowl, which is beneficial to health of waterfowl and meets requirements of animal welfare.

Fourthly, according to the disclosure, manure is collected by the transfer mechanism. After a certain amount is collected, the transfer mechanism transports the manure to the fermentation mechanism for fermentation, the fermentation and resource utilization of the manure is realized, and a high degree of automation and environmental protection breeding of waterfowl are realized.

BRIEF DESCRIPTION OF THE DRAWINGS

In order to explain technical schemes in the embodiment of the disclosure or technical schemes in the prior art more clearly, drawings needed in embodiments are briefly introduced below. Apparently, the drawings in a following description are only some embodiments of the disclosure. For those of ordinary skill in the art, other drawings may be obtained according to these drawings without making a creative efforts.

DETAILED DESCRIPTION OF THE EMBODIMENTS

In the following, technical schemes in embodiments of the disclosure may be clearly and completely described with reference to attached drawings in embodiments of the disclosure. Apparently, the described embodiments are only a part of the embodiments of the disclosure, but not all embodiments. Based on the embodiments in the disclosure, all other embodiments obtained by those of ordinary skill in the art without a creative efforts belong to a scope of protection of the disclosure.

In order to make above objects, features and advantages of the disclosure more apparent and easier to understand, the disclosure may be further described in detail with the attached drawings and specific embodiments.

Figure 1:
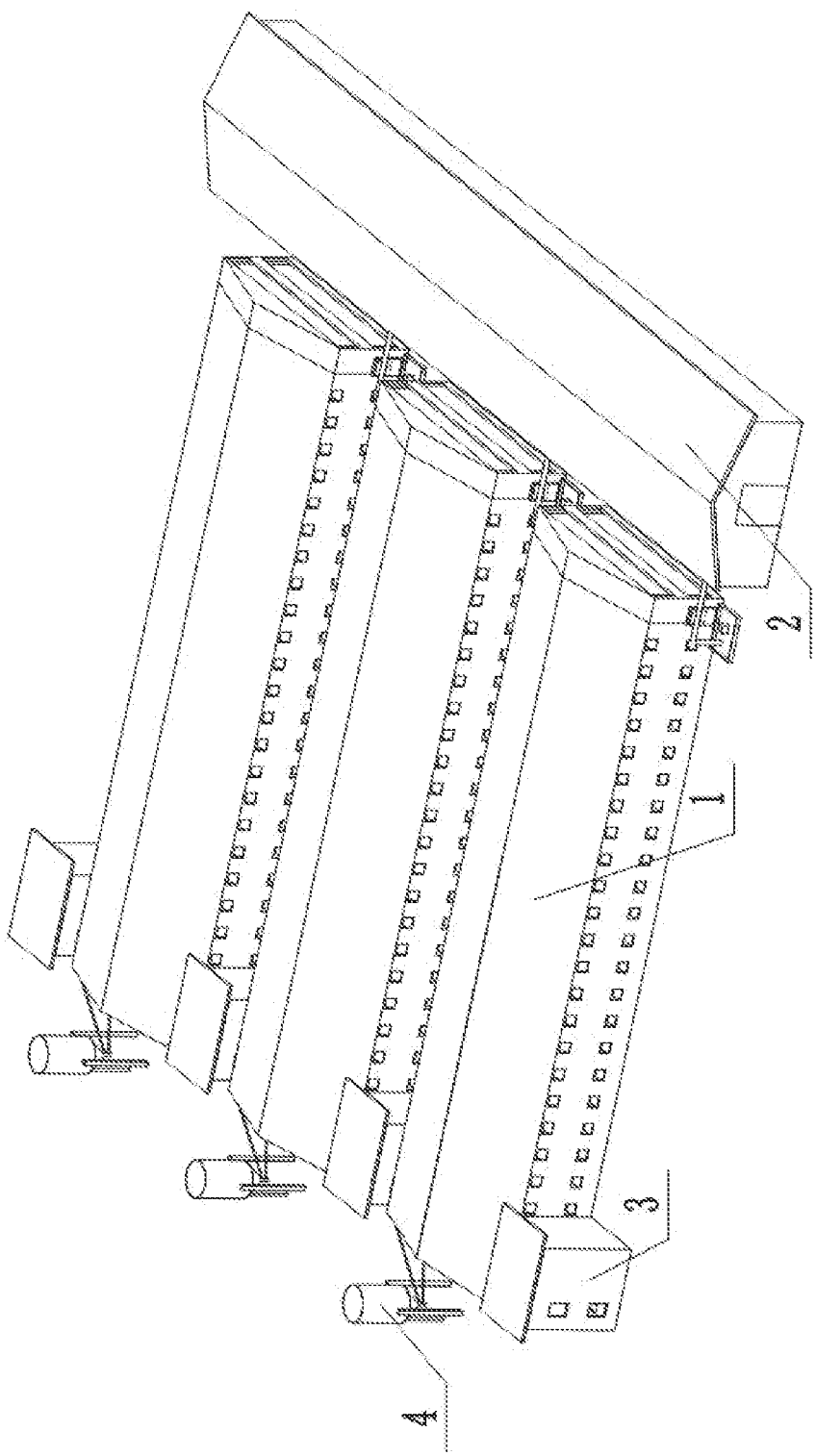
FIG. 1 is a schematic diagram of an overall structure of the disclosure.
Figure 2:
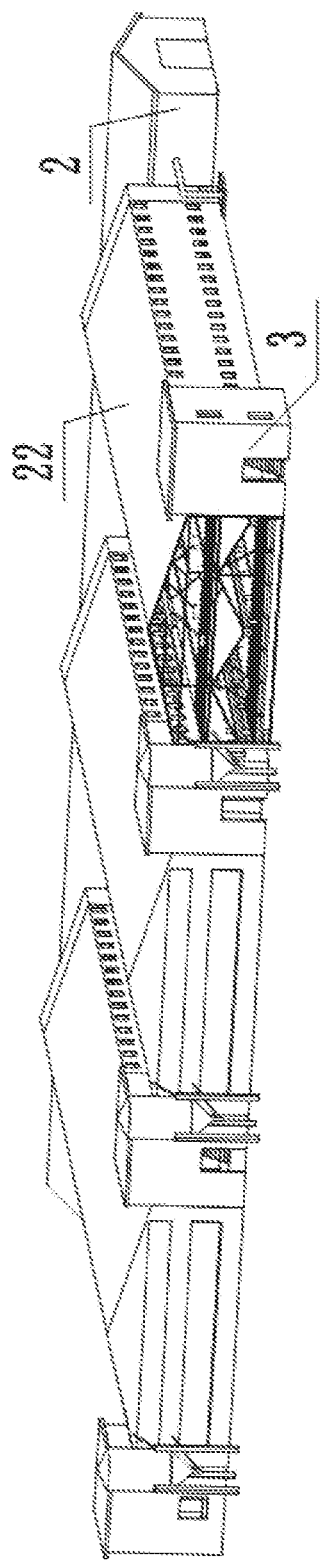
FIG. 2 is a schematic structural diagram of the disclosure from a side view.
Figure 3:
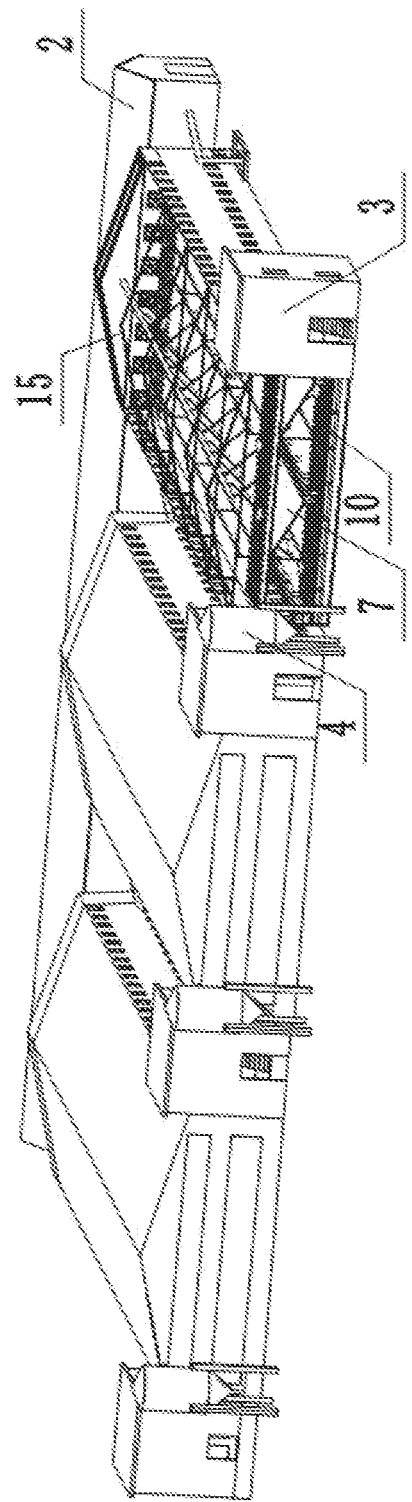
FIG. 3 is a schematic diagram of an internal structure of a house body of the disclosure.
Figure 4:
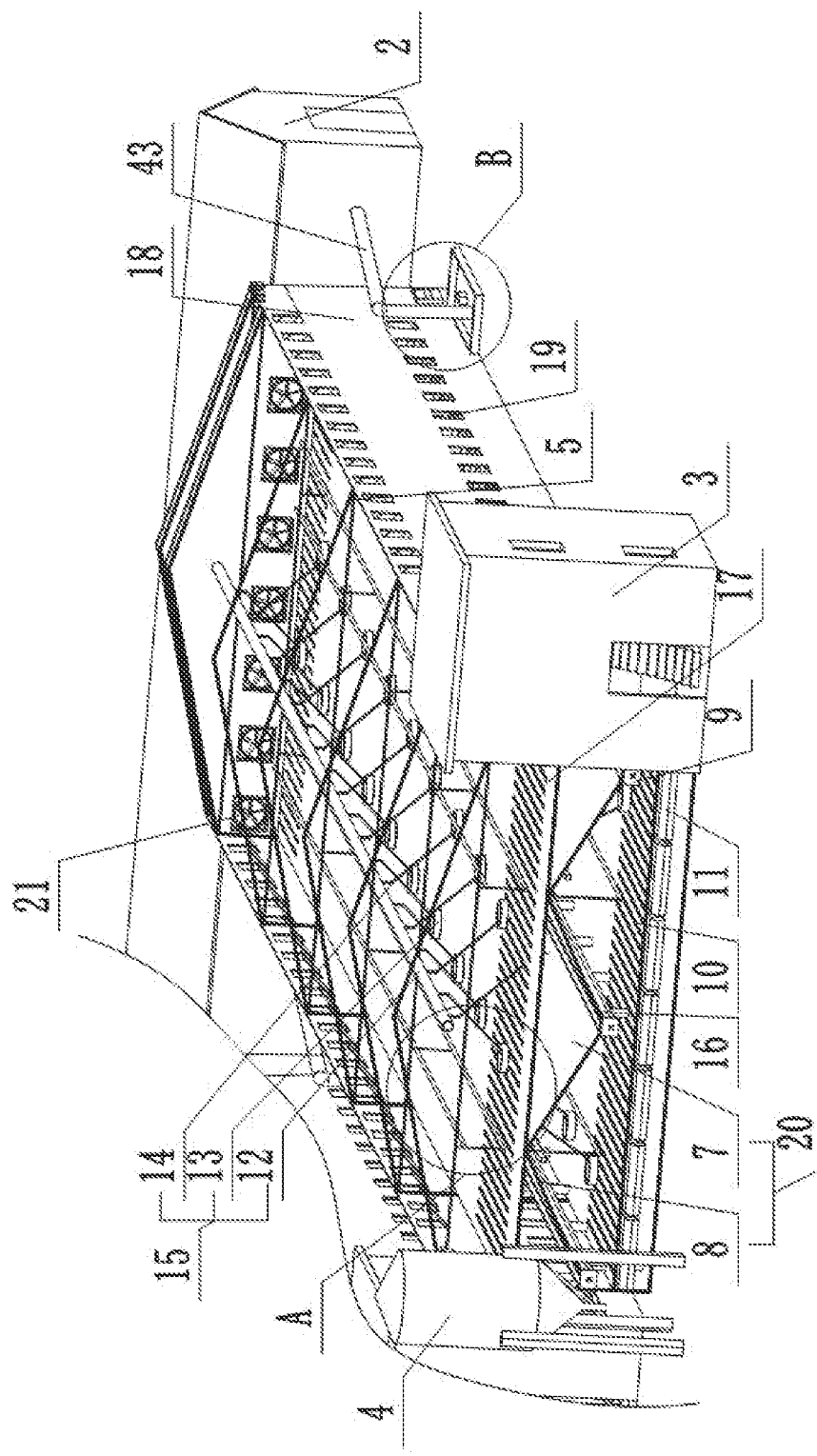
FIG. 4 is a schematic diagram of an internal detail structure of a house body of the disclosure.
Figure 5:
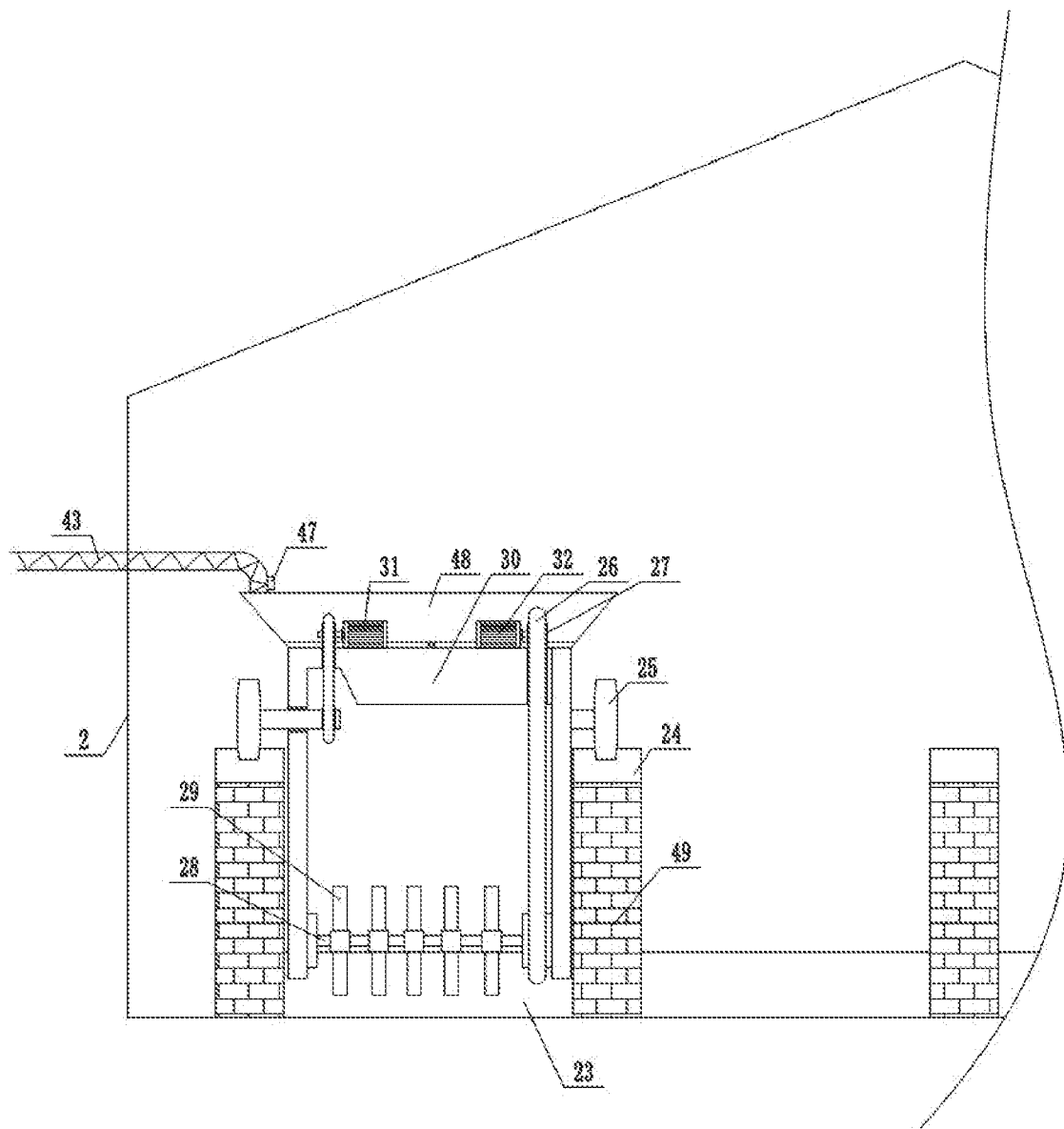
FIG. 5 is a schematic structural diagram of a manure treatment room and a fermentation mechanism of the disclosure.
Figure 6:
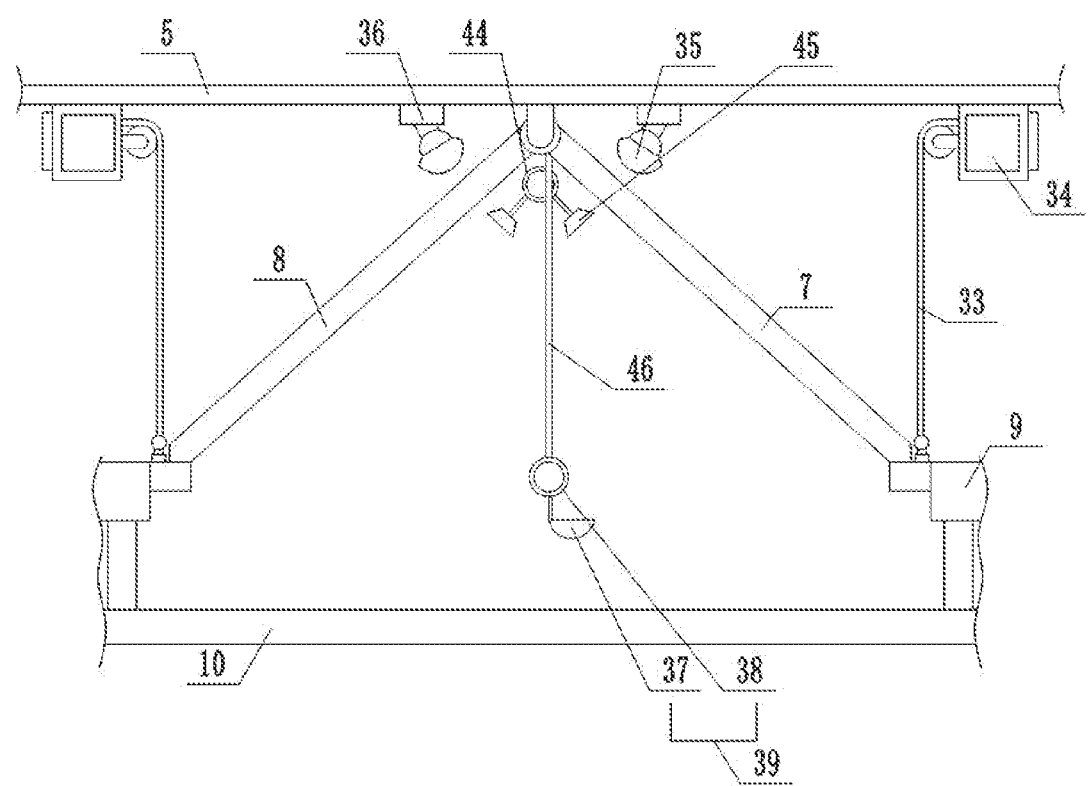
FIG. 6 is a schematic structural diagram of a manure dropping mechanism of the disclosure.
Figure 7:
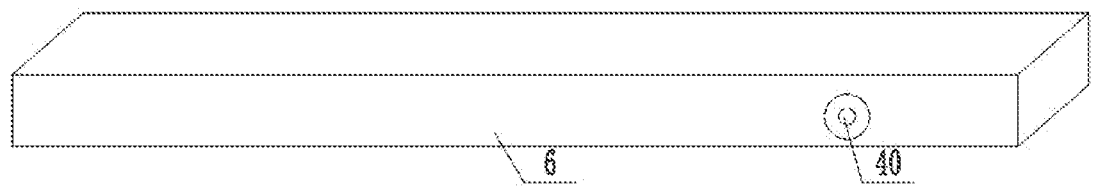
FIG. 7 is a schematic structural diagram of a manure collection tank in the disclosure.
Figure 8:
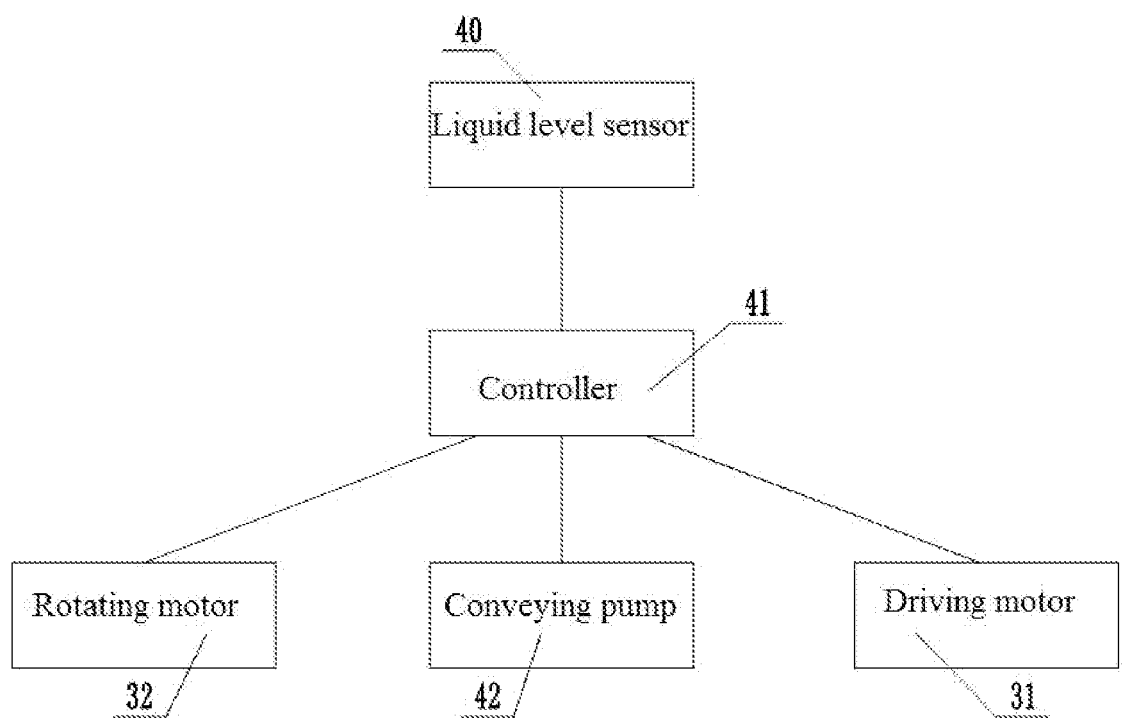
FIG. 8 is a schematic diagram of electrical connection of a controller in the disclosure.
Figure 9:
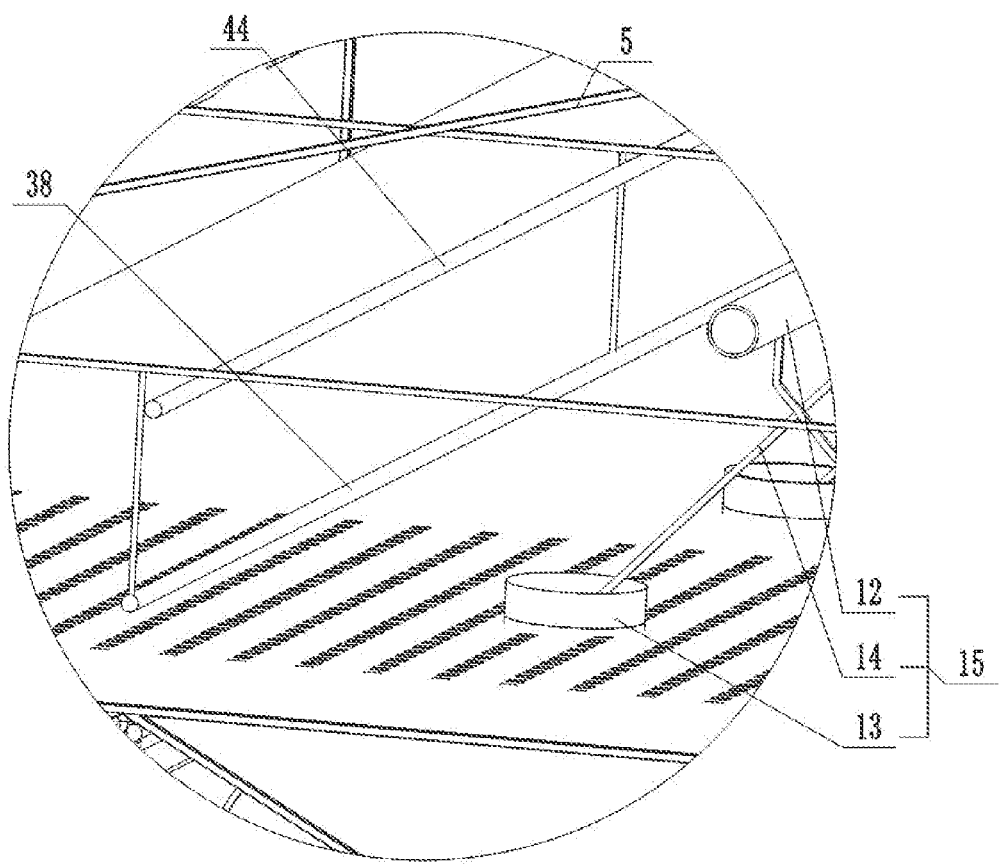
FIG. 9 is an enlarged view of A in FIG. 4.
Figure 10:
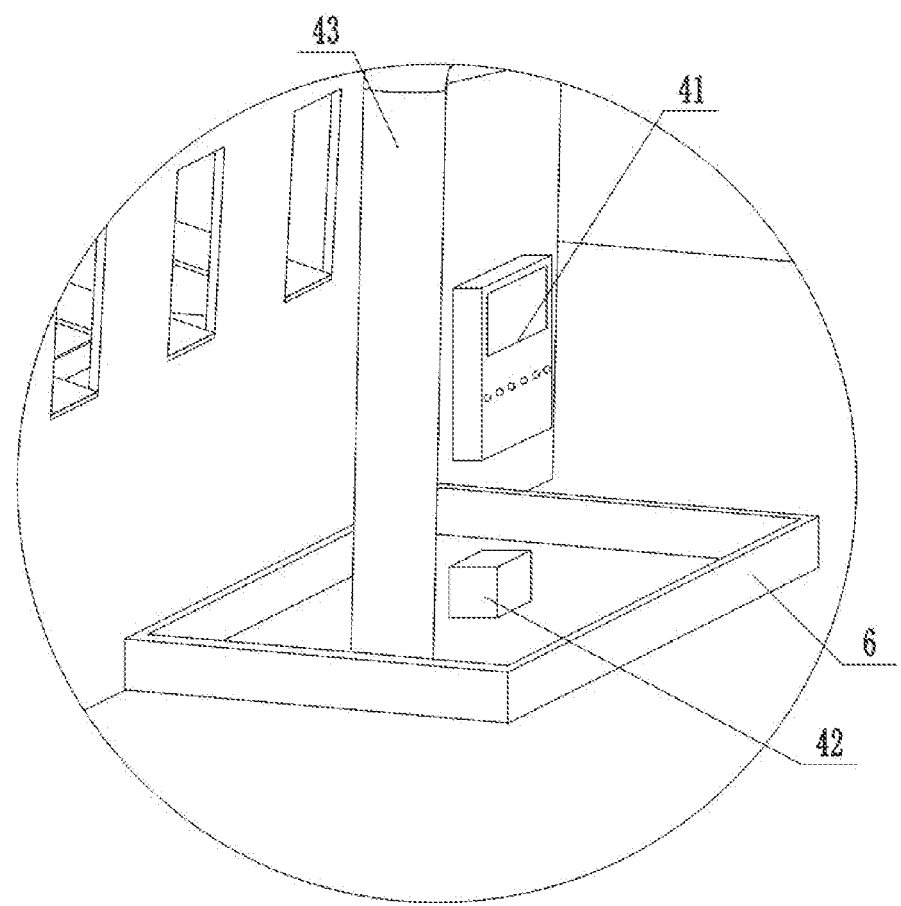
FIG. 10 is an enlarged view of B in FIG. 4.

As shown in FIGS. 1 to 10, the disclosure provides a multi-layer, intelligent and environment-friendly breeding structure for meat waterfowl, including house bodies 1, a manure treatment room 2, staircases 3 and feeders 4, where a plurality of house bodies 1 are arranged. One side of each of the plurality of house bodies 1 is provided with one of the staircases 3, and each of the staircases 3 is communicated with corresponding one of the house bodies 1. The manure treatment room 2 is arranged at rear ends of the house bodies 1, a fermentation mechanism is arranged in the manure treatment room 2, and the feeders 4 are arranged respectively at front ends of the plurality of house bodies 1. A bottom end net bed 10 and an upper layer net bed 17 are fixedly connected in the each of the house bodies 1, and the upper layer net bed 17 is located above the bottom end net bed 10. A plurality of manure dropping mechanisms 20 are arranged side by side between the bottom end net bed 10 and the upper layer net bed 17, and the manure dropping mechanisms 20 are fixedly connected with the each of the house bodies 1. Conveying mechanisms are arranged respectively on both sides of each of the manure dropping mechanisms 20, and one conveying mechanism is shared between two adjacent manure dropping mechanisms 20. The conveying mechanisms are fixedly connected at a top end of the bottom end net bed 10, and a plurality of conveyor belt conveyors 11 are arranged side by side below the bottom end net bed 10. A transfer mechanism is arranged at one side of the each of the house bodies 1, and the transfer mechanism is used for collecting manure on the conveyor belt conveyors 11 and the conveying mechanisms and transporting the manure to the fermentation mechanism. Feeding mechanisms 15 are arranged above the bottom end net bed 10 and above the upper layer net bed 17, and the feeding mechanisms 15 are fixedly connected with the each of the house bodies 1, and each of the feeders 4 is communicated with the feeding mechanisms 15. A ventilation mechanism is installed on the each of the house bodies 1.

In an embodiment, a distance between the bottom end net bed and the upper layer net bed 17 is 1.8 m.

According to the disclosure, the bottom end net bed 10 and the upper layer net bed 17 which are parallel up and down are arranged in the each of the house bodies 1, so that an activity space for the meat waterfowl is effectively increased. Moreover, a house with this structure may provide a comfortable environment similar to floor-rearing for the meat waterfowl, which is beneficial to health of the waterfowl and meets requirements of animal welfare.

In an embodiment, the each of the manure dropping mechanisms 20 includes a first smooth plate 7 and a second smooth plate 8 located between the bottom end net bed 10 and the upper layer net bed 17. Polished rods are fixedly connected to the each of the house bodies 1, and one side of the first smooth plate 7 and one side of the second smooth plate 8 are both rotatably connected to one of the polished rods, and two sides of the one of the polished rods are symmetrically provided with first winders 34, and the first winders 34 are fixedly connected with the each of the house bodies 1. The first winders 34 are wound with first pull ropes 33, an end of one of the first pull ropes 33 is fixedly connected with an other side of the first smooth plate 7, and an end of an other of the first pull ropes 33 is fixedly connected with an other side of the second smooth plate 8.

In a normal state, the first smooth plate 7 and the second smooth plate 8 are both in an inclined state. The first smooth plate 7 and the second smooth plate 8 are used to treat and transport the manure flowing down from the upper layer net bed 17. The manure will freely slide into conveying grooves 9 from the first smooth plate 7 and the second smooth plate 8, and the manure will be conveyed to a manure collection tank 6 at one end of the house by screw conveyors 16 in the conveying grooves 9. The manure dropping mechanisms 20 effectively prevent the manure from an upper layer from dripping to a lower layer, and solve a problem of unreasonable design of a traditional manure retaining plate. When meat waterfowl are ready for slaughter or workers need to walk on a first layer, the first winders 34 are started, and the first pull ropes 33 are driven by the first winders 34 to wind and fold to hoist other ends of the first smooth plate 7 and the second smooth plate 8. Therefore, a whole manure dropping mechanism 20 is in a relatively horizontal state, and an adjustment of an inclination angle is realized, thereby increasing an activity space of the upper layer and the lower layer, which not only facilitates activities of the workers, but also solves a problem that traditional multi-layer caged breeding meat waterfowl are difficult to slaughter.

In an embodiment, washing mechanisms are arranged above the first smooth plate 7 and the second smooth plate 8 respectively, and each of the washing mechanisms includes a shower pipe 36. The shower pipe 36 is fixedly connected with the each of the house bodies 1, and a bottom end of the shower pipe 36 is fixedly connected with a plurality of spray heads 35, and the plurality of spray heads 35 are all communicated with the shower pipe 36.

The spray heads 35 are used to spray water on the first smooth plate 7 and the second smooth plate 8 to wash surfaces of the first smooth plate 7 and the second smooth plate 8.

In an embodiment, the shower pipe 36 communicates with an external water supply system (not shown in a figure).

In an embodiment, the transfer mechanism includes a manure collection tank 6 arranged at one side of the house body 1, and the conveyor belt conveyors 11 and the conveying mechanisms are communicated with the manure collection tank 6. A liquid level sensor 40 is fixedly connected to an inner wall at a top of the manure collection tank 6, a conveying pump 42 is fixedly connected to a bottom end of the manure collection tank 6, and a discharge end of the conveying pump 42 is fixedly connected to a conveying pipeline 43. An end of the conveying pipeline 43 is positioned above the fermentation mechanism, and an outer wall at the end of the conveying pipeline 43 is fixedly connected with an infrared sensor 47. A controller 41 is fixedly connected to a side wall of the house body 1, and the conveying pump 42, the liquid level sensor 40, the infrared sensor 47 and the fermentation mechanism are all electrically connected to the controller 41.

In an embodiment, the conveying mechanisms include the conveying grooves 9, where the conveying grooves 9 are fixedly connected to the top end of the bottom end net bed 10, the conveying grooves 9 are arranged respectively on both sides of the each of the manure dropping mechanisms 20, and one conveying groove 9 is shared between the two adjacent manure dropping mechanisms 20. Screw conveyors 16 are fixedly connected in the conveying grooves 9, and the conveying grooves 9 are communicated with the manure collection tank 6.

In an embodiment, one side of the first smooth plate 7 away from the one of the polished rods and one side of the second smooth plate 8 away from the one of the polished rods are provided with the conveying grooves 9 respectively, and one conveying groove 9 is shared between the first smooth plate 7 and the second smooth plate 8 of the two adjacent manure dropping mechanisms 20.

In an embodiment, the fermentation mechanism includes fermentation tanks 49 fixedly connected to a bottom end of the manure treatment room 2, where a fermentation bed 23 is laid at a bottom end of each of the fermentation tanks 49, and a rake-turning machine is erected at a top end of the each of the fermentation tanks 49. A manure hopper 48 is hinged at a top end of the rake-turning machine, and the end of the conveying pipeline 43 is located above the manure hopper 48, and a hydraulic cylinder is arranged between the manure hopper 48 and the top end of the rake-turning machine. One end of the hydraulic cylinder is hinged with the rake-turning machine, and an other end of the hydraulic cylinder is hinged with the manure hopper 48, and the rake-turning machine is electrically connected with the controller 41.

In an embodiment, the fermentation tanks 49 are arranged side by side.

In an embodiment, the hydraulic cylinder is connected with an external oil supply system (not shown in a figure). A hydraulic oil pump of the external oil supply system is electrically connected with the controller 41 for controlling oil inlet and oil return of the oil supply system, thereby controlling extension and shortening of the hydraulic cylinder.

In an embodiment, the rake-turning machine includes a frame 30, where the hydraulic cylinder and the manure hopper 48 are both hinged at a top end of the frame 30. A rack 24 is fixedly connected at the top end of the each of the fermentation tanks 49, travelling gears 25 are rotatably connected at both sides of the frame 30 respectively, and each of the travelling gears 25 is meshed with the rack 24. A rotating roller 28 is arranged below the frame 30, a plurality of rake-turning teeth 29 are fixedly connected on the rotating roller 28, and a driving motor 31 and a rotating motor 32 are fixedly connected at the top end of the frame 30. The driving motor 31 and one of the travelling gears 25 are in transmission connection through one of belts 26, the rotating motor 32 and the rotating roller 28 are in transmission connection through another one of the belts 26, and the driving motor 31 and the rotating motor 32 are electrically connected with the controller 41.

When in use, the manure generated by livestock on the bottom end net bed 10 falls onto the conveyor belt conveyors 11 and is conveyed into the manure collection tank 6 through the conveyor belt conveyors 11. The manure generated by livestock on the upper layer net bed 17 falls onto the manure dropping mechanisms 20, slides into the conveying grooves 9 by the manure dropping mechanisms 20 and is conveyed into the manure collection tank 6 by the screw conveyors 16 in the conveying grooves 9. The liquid level sensor 40 is installed in the manure collection tank 6. When an amount of the manure reaches a set height, the controller 41 controls the infrared sensor 47 on the conveying pipeline 43 to turn on, and at the same time the rake-turning machine is controlled to start running. When the rake-turning machine runs below the conveying pipeline 43, the infrared sensor 47 turns off and the rake-turning machine stops running. The controller 41 controls the conveying pump 42 in the manure collection tank 6 to turn on, transfer the manure into the manure hopper of the rake-turning machine, and start timing of transportation. After the timing is finished, manure conveying is stopped, and the controller 41 controls the rake-turning machine to run and the hydraulic cylinder is started. The manure hopper is tipped over to sprinkle the manure on the fermentation bed 23, and the rotating roller 28 is controlled to rotate to drive the rake-turning teeth 29 to move, so as to fully mix the manure with padding for fermentation. The controller 41 controls transfer and stirring fermentation of the manure, the degree of automatic and intelligent is high, and a harmless and resource-saving treatment of the manure is realized.

In an embodiment, an output shaft of the driving motor 31, an output shaft of the rotating motor 32, the travelling gear 25 and the rotating roller 28 are all fixedly connected with pulleys 27, and a pulley 27 on the output shaft of the driving motor 31 and a pulley 27 on the travelling gear 25 are in transmission connection through the belt 26, and the pulley 27 on the output shaft of the rotating motor 32 and a pulley 27 on the rotating roller 28 are in transmission connection through the belt 26.

In an embodiment, the feeding mechanisms 15 include main pipelines 12; the main pipelines 12 are arranged above the bottom end net bed 10 and above the upper layer net bed 17 respectively. The main pipelines 12 are fixedly connected with the each of the house bodies 1, and the main pipelines 12 are communicated with the each of the feeders 4. Each of the main pipelines 12 is fixedly connected with a plurality of branch pipes 14, and ends of the branch pipes 14 are fixedly connected with feeding trays 13 respectively, and the feeding trays 13 and the main pipelines 12 are both communicated with the branch pipes 14.

Feeds are injected into the main pipelines 12 through the feeders 4, and the feeds in the main pipelines 12 fall into the feeding trays through the branch pipes 14, so that the meat waterfowl may be fed conveniently.

In an embodiment, the structure also includes water feeding mechanisms 39, where the water feeding mechanisms 39 include water feeding pipes 38, and the water feeding pipes 38 are arranged above the bottom end net bed 10 and above the upper layer net bed 17 respectively; a second winder is arranged above each of the water feeding pipes 38, and the second winder is fixedly connected with the each of the house bodies 1; a second pull rope 46 is wound around the second winder, and an end of the second pull rope 46 is fixedly connected with the each of the water feeding pipes 38; a plurality of nipple drinking fountains 37 are fixedly connected to the each of the water feeding pipes 38, and the plurality of nipple drinking fountains 37 are communicated with the each of the water feeding pipes 38.

Water is injected into the water feeding pipes 38 through an external water source. When the meat waterfowl wants to drink water, the meat waterfowl may drink water through the nipple drinking fountains 37. The each of the water feeding pipes 38 is connected with the second winder through the second pull rope 46, so that a height of the each of the water feeding pipes 38 may be adjusted according to different ages of the meat waterfowl, which is convenient for the meat waterfowl to drink water.

In an embodiment, the water feeding pipes 38 are externally connected with a water source (not shown in the figure).

In an embodiment, a spray disinfection mechanism is arranged above the each of the water feeding pipes 38, and the spray disinfection mechanism includes a disinfection pipeline 44 located above the each of the water feeding pipes 38. The disinfection pipeline 44 is fixedly connected with outer wall panels 18, and a plurality of disinfection nozzles 45 are fixedly connected to the disinfection pipeline 44. The plurality of disinfection nozzles 45 are communicated with the disinfection pipeline 44, and there is a disinfectant source (not shown in the figure) outside the disinfection pipeline 44. A poultry house may be sprayed and disinfected regularly according to needs through the spray disinfection mechanism.

In an embodiment, the ventilation mechanism includes ventilation fans 21, and a rear end of the house body 1 is provided with a plurality of through holes, and the ventilation fans 21 are fixedly connected in the through holes, and a side of the house body 1 close to the staircase 3 and a side of the house body 1 away from the staircase 3 are both provided with ventilation windows 19.

By operating the ventilation fans 21, outside air is introduced into the each of the house bodies 1 through the ventilation windows 19, and gas in the each of the house bodies 1 is exhausted, which not only cools an internal environment of the each of the house bodies 1, but also may ventilate and disperse the smell.

In an embodiment, the ventilation windows 19 are arranged in two rows up and down.

In an embodiment, the rear end of the each of the house bodies 1 is provided with a deodorizing room which is communicated with the ventilation fans 21, and deodorizing equipment is fixedly connected in the deodorizing room, so that waste gas discharged from the each of the house bodies 1 is deodorized and pollution to a surrounding environment is reduced.

In an embodiment, the each of the house bodies 1 includes a steel support frame 5 fixed on a ground, cement is paved on the ground, outer sides of the steel support frame 5 are fixedly connected with the outer wall panels 18. A top end of the steel support frame 5 is fixedly connected with roofs 22, the bottom end net bed 10, the upper layer net bed 17, the first winders 34, a second winder roller, the shower pipe 36 and the polished rods are all fixedly connected with the steel support frame 5, and one end of the each of the main pipelines 12 is fixedly connected with an inner wall of one of the outer wall panels 18 at a front end. An other end of the each of the main pipelines 12 is fixedly connected with an inner wall of one of the outer wall panels 18 at a rear end, and the through holes are located on the one of the outer wall panels 18 at the rear end. One end of the disinfection pipeline 44 is fixedly connected with the inner wall of the one of the outer wall panels 18 at the front end, and the other end of the disinfection pipeline 44 is fixedly connected with the inner wall of the one of the outer wall panels 18 at the rear end. The ventilation windows 19 are opened on one of the outer wall panels 18 close to the staircase 3 and one of the outer wall panels 18 away from the staircase 3. The controller 41 is fixedly connected with the outer wall panels 18 and is close to the rear end of the each of the house bodies 1.

In an embodiment, the controller 41 may also control an operation of the ventilation fans 21 and opening of the ventilation windows 19 according to in-house and out-house environmental conditions, so as to adjust and control a temperature in the each of the house bodies 1 to meet a living temperature of the meat waterfowl, control the feeders 4 to feed into the feeding trays 13 as required, regularly control the washing mechanisms to wash and clean the first smooth plate 7 and the second smooth plate 8, and regularly control the spray disinfection mechanism to disinfect the each of the house bodies 1, thus realizing intelligent environmental control and intelligent feeding. The disclosure adopts a multi-layer structure, which reduces an occupied area and is closer to a condition of floor-rearing.

In a description of the disclosure, it should be understood that terms "vertical", "horizontal", "up", "down", "front", "back", "left", "right", "vertical", "horizontal", "top", "bottom", "inside", "outside", and other indications of orientation or positional relationships are based on orientation or positional relationships shown in accompanying drawings, solely for a convenience of describing the disclosure, rather than indicating or implying that a device or a component referred to must have a specific orientation, be constructed and operated in a specific orientation, therefore it may not be understood as a limitation of the disclosure.

The above-mentioned embodiments only describe preferred modes of the disclosure, and do not limit a scope of the disclosure. Under a premise of not departing from a design spirit of the disclosure, various modifications and improvements made by those of ordinary skill in the art to the technical scheme of the disclosure shall fall within a protection scope determined by claims of the disclosure.

What is claimed is:

1. A multi-layer, intelligent and environment-friendly breeding structure for meat waterfowl, comprising house bodies, a manure treatment room, staircases and feeders, wherein a plurality of house bodies are arranged; one side of each of the plurality of house bodies is provided with each of the staircases, and each of the staircases is communicated with each of the house bodies; the manure treatment room is arranged at rear ends of the house bodies, a fermentation mechanism is arranged in the manure treatment room, and the feeders are arranged at front ends of the plurality of house bodies; a bottom end net bed and an upper layer net bed are fixedly connected in each of the house bodies, and the upper layer net bed is located above the bottom end net bed; a plurality of manure dropping mechanisms are arranged side by side between the bottom end net bed and the upper layer net bed, and the manure dropping mechanisms are fixedly connected with each of the house bodies; conveying mechanisms are arranged on both sides of each of the manure dropping mechanisms, and one of the conveying mechanisms is shared between two adjacent manure dropping mechanisms; the conveying mechanisms are fixedly connected at a top end of the bottom end net bed, and a plurality of conveyor belt conveyors are arranged side by side below the bottom end net bed; a transfer mechanism is arranged at one side of each of the house bodies, and the transfer mechanism is used for collecting manure on the conveyor belt conveyors and the conveying mechanisms and transporting the manure to the fermentation mechanism; feeding mechanisms are arranged above the bottom end net bed and above the upper layer net bed, and the feeding mechanisms are fixedly connected with each of the house bodies, and each of the feeders is communicated with the feeding mechanisms; and a ventilation mechanism is installed on each of the house bodies;

each of the manure dropping mechanisms comprises a first smooth plate and a second smooth plate located between the bottom end net bed and the upper layer net bed; polished rods are fixedly connected to each of the house bodies, and one side of the first smooth plate and one side of the second smooth plate are both rotatably connected to one of the polished rods, and two sides of one of the polished rods are symmetrically provided with first winders, and the first winders are fixedly connected with each of the house bodies; the first winders are wound with first pull ropes, an end of one of the first pull ropes is fixedly connected with an other side of the first smooth plate, and an end of an other of the first pull ropes is fixedly connected with an other side of the second smooth plate;

washing mechanisms are arranged above the first smooth plate and the second smooth plate respectively, and each of the washing mechanisms comprises a shower pipe; the shower pipe is fixedly connected with each of the house bodies, and a bottom end of the shower pipe is fixedly connected with a plurality of spray heads, and the plurality of spray heads are all communicated with the shower pipe;

the transfer mechanism comprises a manure collection tank arranged at one side of each of the house bodies, and the conveyor belt conveyors and the conveying mechanisms are communicated with the manure collection tank; a liquid level sensor is fixedly connected to an inner wall at a top of the manure collection tank, a conveying pump is fixedly connected to a bottom end of the manure collection tank, and a discharge end of the conveying pump is fixedly connected with a conveying pipeline; an end of the conveying pipeline is positioned above the fermentation mechanism, and an outer wall at the end of the conveying pipeline is fixedly connected with an infrared sensor; a controller is fixedly connected to a side wall of each of the house bodies, and the conveying pump, the liquid level sensor, the infrared sensor and the fermentation mechanism are all electrically connected to the controller;

the conveying mechanisms comprise conveying grooves, wherein the conveying grooves are fixedly connected to the top end of the bottom end net bed, the conveying grooves are arranged respectively on both sides of each of the manure dropping mechanisms, and one of the conveying grooves is shared between two adjacent manure dropping mechanisms; a screw conveyor is fixedly connected in each of the conveying grooves, and the conveying grooves are communicated with the manure collection tank;

the fermentation mechanism comprises fermentation tanks fixedly connected to a bottom end of the manure treatment room, wherein a fermentation bed is laid at a bottom end of each of the fermentation tanks, and a rake-turning machine is erected at a top end of each of the fermentation tanks; a manure hopper is hinged at a top end of the rake-turning machine, and the end of the conveying pipeline is located above the manure hopper, and a hydraulic cylinder is arranged between the manure hopper and the top end of the rake-turning machine; one end of the hydraulic cylinder is hinged with the rake-turning machine, and an other end of the hydraulic cylinder is hinged with the manure hopper, and the rake-turning machine is electrically connected with the controller;

the rake-turning machine comprises a frame, wherein the hydraulic cylinder and the manure hopper are both hinged at a top end of the frame; a rack is fixedly connected at the top end of each of the fermentation tanks, travelling gears are rotatably connected at both sides of the frame respectively, and each of the travelling gears is meshed with the rack; a rotating roller is arranged below the frame, a plurality of rake-turning teeth are fixedly connected on the rotating roller, and a driving motor and a rotating motor are fixedly connected at the top end of the frame; the driving motor and one of the travelling gears, the rotating motor and the rotating roller are respectively in transmission connection through belts, and the driving motor and the rotating motor are electrically connected with the controller.

2. The multi-layer, intelligent and environment-friendly breeding structure for meat waterfowl according to claim 1, wherein the feeding mechanisms comprise main pipelines; the main pipelines are arranged above the bottom end net bed and above the upper layer net bed; the main pipelines are fixedly connected with each of the house bodies, and the main pipelines are communicated with each of the feeders; each of the main pipelines is fixedly connected with a plurality of branch pipes, and ends of the plurality of branch pipes are fixedly connected with feeding trays respectively, and the feeding trays and the main pipelines are both communicated with the branch pipes.

3. The multi-layer, intelligent and environment-friendly breeding structure for meat waterfowl according to claim 1, further comprising water feeding mechanisms, wherein the water feeding mechanisms comprise water feeding pipes, and the water feeding pipes are arranged above the bottom end net bed and above the upper layer net bed; a second winder is arranged above each of the water feeding pipes, and the second winder is fixedly connected with each of the house bodies; a second pull rope is wound around the second winder, and an end of the second pull rope is fixedly connected with each of the water feeding pipes; a plurality of nipple drinking fountains are fixedly connected to each of the water feeding pipes, and the plurality of nipple drinking fountains are communicated with each of the water feeding pipes.

4. The multi-layer, intelligent and environment-friendly breeding structure for meat waterfowl according to claim 1, wherein the ventilation mechanism comprises ventilation fans, and a rear end of each of the house bodies is provided with a plurality of through holes, and the ventilation fans are fixedly connected in the through holes, and a side of each of the house bodies close to each of the staircases and a side of each of the house bodies away from each of the staircases are both provided with ventilation windows.

* * * * *